US009396761B2

(12) United States Patent
Thomas et al.

(10) Patent No.: US 9,396,761 B2
(45) Date of Patent: Jul. 19, 2016

(54) METHODS AND SYSTEMS FOR GENERATING AUTOMATIC REPLAYS IN A MEDIA ASSET

(71) Applicant: United Video Properties, Inc., Santa Clara, CA (US)

(72) Inventors: William Thomas, Evergreen, CO (US); Daniel Thomas Ward, Encino, CA (US)

(73) Assignee: Rovi Guides, Inc., San Carlos, CA (US)

( * ) Notice: Subject to any disclaimer, the term of this patent is extended or adjusted under 35 U.S.C. 154(b) by 386 days.

(21) Appl. No.: 13/959,050

(22) Filed: Aug. 5, 2013

(65) Prior Publication Data
US 2015/0037013 A1    Feb. 5, 2015

(51) Int. Cl.
*H04N 9/80* (2006.01)
*H04N 5/93* (2006.01)
*G11B 27/10* (2006.01)
*G11B 27/00* (2006.01)

(52) U.S. Cl.
CPC ............ *G11B 27/105* (2013.01); *G11B 27/007* (2013.01)

(58) Field of Classification Search
USPC ................................................. 386/239–262
See application file for complete search history.

(56) References Cited

U.S. PATENT DOCUMENTS

| 2005/0141859 A1* | 6/2005 | Cheatle | G11B 27/031 386/241 |
| 2008/0256576 A1* | 10/2008 | Nesvadba | H04H 60/59 725/39 |
| 2012/0304216 A1* | 11/2012 | Strong | H04N 21/440281 725/25 |
| 2013/0124533 A1 | 5/2013 | Yadav et al. | |
| 2014/0270704 A1* | 9/2014 | Zaveri | H04N 21/4325 386/248 |
| 2015/0089520 A1* | 3/2015 | Lee | H04N 21/251 725/14 |

* cited by examiner

*Primary Examiner* — Hung Dang
(74) *Attorney, Agent, or Firm* — Ropes & Gray LLP

(57) ABSTRACT

Methods and systems are disclosed herein for a media guidance application that can automatically generate replays of particular segments of a media asset. For example, the media guidance application may determine that a segment viewed by a user is of particular interest to the user based on a comparison with a user criterion. Accordingly, upon detecting the end of the segment, the media guidance application may automatically return to the beginning of the segment, allowing the user to view the segment again.

18 Claims, 5 Drawing Sheets

METHODS AND SYSTEMS FOR GENERATING AUTOMATIC REPLAYS IN A MEDIA ASSET

BACKGROUND OF THE INVENTION

Conventional media systems allow users to access a plethora of media assets. Moreover, conventional media systems allow users to perform numerous trick-play (e.g., pause, rewind, fast-forward, etc.) operations during the presentation of a media asset. Such operations allow a user to view particular portions of a media asset outside the normal progression of the media asset. For example, after viewing a particularly interesting scene of a movie, a user may wish to view the scene again.

However, even if a user knows the location of a particular segment of a media asset in which he/she is interested, the user must still spend time manually controlling the trick-play operations (and invariably rewinding too far and/or fast-forwarding too far) to locate the particular segment. The time and effort to find particular scenes or manually entering the trick-play operations may discourage the user, resulting in the user abandoning the attempt to find or view the interesting segment.

SUMMARY OF DISCLOSURE

Accordingly, methods and systems are disclosed herein for a media guidance application that can automatically generate replays of particular segments of a media asset. For example, while a user is viewing a media asset, the media guidance application may determine that a segment of the media asset is of particular interest to the user based on a comparison of the segment with a user criterion. Accordingly, upon detecting the end point of the segment, the media guidance application may automatically return to a detected beginning point of the segment, allowing the user to view the segment again.

In some aspects, the media guidance application generates an automatic replay in a media asset by identifying a main action sequence occurring in the media asset while the media asset is presented to a user. The media guidance application then compares the identified main action sequence to a user criterion (e.g., whether or not the identified main action sequence corresponds to a media interest of a user, a user selection indicting a desire to automatically replay the identified main action sequence, or information generated from a remote location indicating users are likely to desire to automatically replay the identified main action sequence). The media guidance application may then determine whether or not to replay the main action sequence based on the comparison. If the media guidance application determines to replay the main action sequence based on the comparison, the media guidance application interrupts the presentation of the media asset and automatically replays the main action sequence. The media guidance application may then resume the presentation of the media asset after automatically replaying the main action sequence.

In some aspects, comparing the identified main action sequence to the user criterion further comprises the media guidance application determining a ranking associated with the identified main action sequence, in which the ranking indicates an amount the identified main action sequence corresponds to the user criterion, receiving a threshold ranking associated with the identified main action sequence, in which the threshold ranking indicates a minimum amount that main action sequences must correspond to the user criterion to be replayed, and in response to determining that the ranking corresponds to the threshold ranking, transmitting an instruction to automatically replay the identified main action sequence. For example, the media guidance application may assign numerical amounts that represent how well a particular identified main action sequence corresponds to the user criterion. The media guidance application may then compare the numerical amount to a threshold numerical amount (e.g., corresponding to the threshold ranking), in order to cull identified main action sequences that do not have a high level of correspondence (e.g., indicated by a low ranking).

In some aspects, the media guidance application may determine a number of times to automatically replay the main action sequence based on the ranking. For example, the media guidance application may replay a first identified main action sequence twice and a second identified main action sequence only once, if the first identified main action sequence has a higher ranking than the second identified main action sequence.

In addition, to determine the threshold ranking, the media guidance application may determine rankings associated with all main action sequences in the media asset, retrieve a maximum number of main action sequences in the media asset that may be automatically replayed (e.g., as determined by a user setting), and select the threshold ranking such that only the maximum number of main action sequences correspond to the threshold ranking. For example, a user may indicate that he/she only wishes for three main action sequences to be replayed, in response the media guidance application may establish a threshold ranking that only three main action sequences in the media asset correspond to (e.g., only three main action sequence have a higher ranking than the threshold ranking).

In some aspects, the media guidance application may also determine a minimum amount of the presentation that must be presented between automatically replaying different main action sequences. For example, in order to prevent the media guidance application replaying every scene (which could distract or annoy the user), the media guidance application may trigger an automatic replay only after a particular amount of time or number of scenes has passed since the last automatic replay was triggered.

In some aspects, the media guidance application may identify the first main action sequence for a media asset by determining a genre of the media asset and retrieving a genre profile, which defines attributes of media content that are indicative of main action sequences, for the determined genre. For example, the attributes may define points typically associated with main action sequences in media assets having the same genre as the media asset. Thus, the media guidance application may identify the main action sequence in the media asset by identifying a point in a play length of the media asset corresponding to the defined points.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
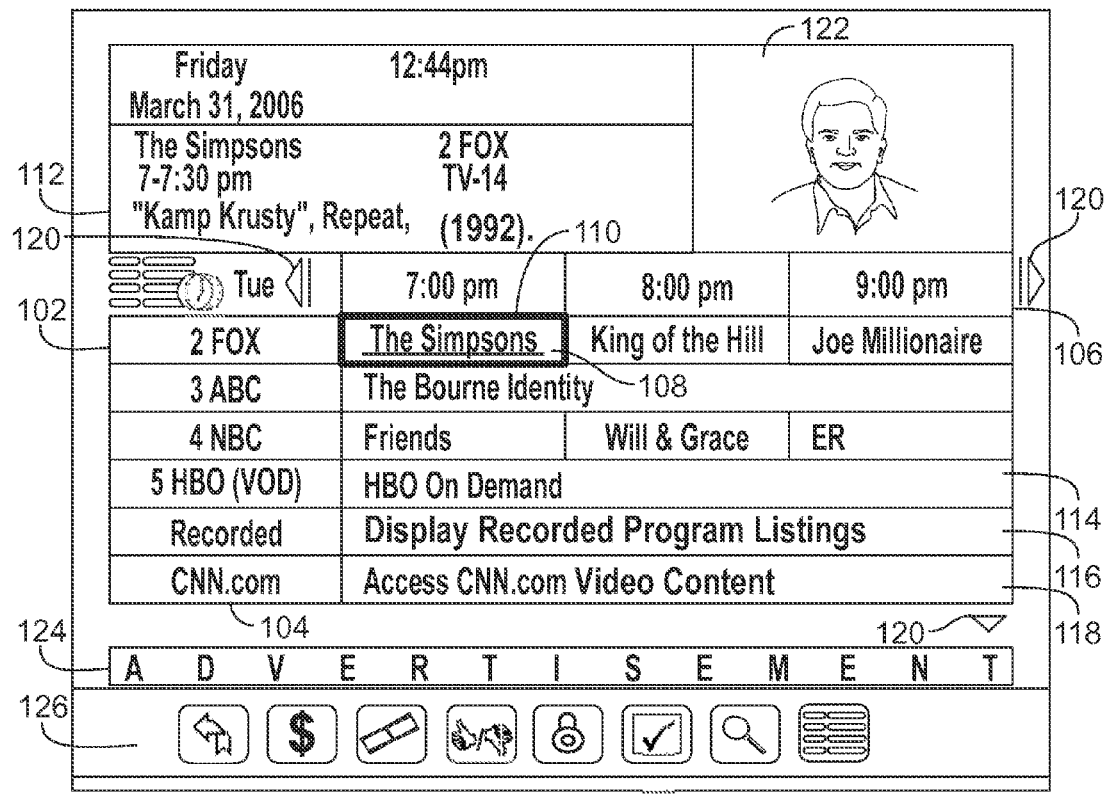
FIG. 1 shows an illustrative media guidance application for selecting media assets in accordance with some embodiments of the disclosure.

The amount of content available to users in any given content delivery system can be substantial. Consequently, many users desire a form of media guidance through an interface that allows users to efficiently navigate and access content selections and easily identify content, or portions of the content, that they may desire. An application that provides such guidance is referred to herein as an interactive media guidance application or, sometimes, interactive media guidance application, a media guidance application, or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among, and locate many types of, content or media assets. Interactive media guidance applications may generate graphical user interface screens that enable a user to navigate among, locate, and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

A media guidance application may also recommend or select media assets or specific portions of media assets for a user to view. For example, the media guidance application may determine that a segment viewed by a user is of particular interest to the user based on a comparison with a user criterion. Accordingly, upon detecting the end point of the segment, the media guidance application may automatically return to a detected beginning point of the segment, allowing the user to view the segment again.

For example, the media guidance application may determine that a particular segment of a movie or a playlist is particularly popular (e.g., based on posts, status updates, or microblog entries on social networks associated with the user, industry ratings metrics, or user-to-user recommendations). In response, the media guidance application may replay the segment for the user. Additionally or alternatively, if the media guidance application determines that a particular media asset in a playlist is of particular interest to the user based on a comparison with a user criterion, the media guidance application may replay the media asset in the playlist one or more times. It should also be noted that any embodiment disclosed herein relating to replaying a segment of a media asset may equally be applied to replaying a media asset in a playlist.

A segment of particular interest to a user may include a main action sequence. As used herein, the term "main action sequence" refers to the particular scene or segment during the play length of a media asset that the media guidance application determines is of interest to the user. For example, in an action movie the main action sequence may be a point in the progress of the media asset featuring a pivotal gunfight, car chase, or other action scene, which is of particular interest to the user. For a sitcom or drama, the main action sequence may be a point in the progress of the media asset where plot points are resolved. For a mystery, the main action sequence may be a point in the progress of the media asset where the unknown elements, upon which the mystery depends, are revealed. For a comedy, the main action sequence may be a point in the progress of the media asset, in which the funniest jokes or stunts are performed. For a sports program, the main action sequence may be a point in the progress of the media asset featuring a pivotal scoring play.

In some embodiments, a main action sequence may be identified, and the media guidance application may determine whether or not the identified main action sequence should be automatically replayed and/or the number of times the identified main action sequence should be replayed based on numerous ways. Systems and methods for identifying main action sequences are discussed in greater detail in connection with Papish, U.S. patent application Ser. No. 13/622,887, filed Sep. 19, 2012, which is hereby incorporated by reference herein in its entirety.

For example, in some embodiments, a main action sequence may be identified by a media guidance application, and the media guidance application may determine whether or not the identified main action sequence should be automatically replayed and/or the number of times the identified main action sequence should be replayed based on information in a genre profile associated with a media asset. As used herein, the term "genre profile" refers to a collection of one or more attributes of media content that are indicative of main action sequences. For example, in an action movie, the main action sequence may be a pivotal action scene. As such, the genre profile for an action movie may define attribute(s) of media content that are indicative of the pivotal action scenes such as a high audio level (e.g., presented during an explosion).

Each genre may include one or more genre profiles. Each genre profile may include one or more attributes. As used herein, "media content attributes" or "attributes of media content" refer to characteristics of media assets of a specific genre used by the media guidance application to determine the main action sequence, the beginning and ending points of a main action sequence, and/or whether or not a user may enjoy a replay of the main action sequence in a media asset in the same genre. In some embodiments, the genre profile, and/or the attribute(s) of media content contained in the genre profile, may be modified or replaced by a user profile, or information with a user profile.

In some embodiments, the genre of a media asset, the main action sequence, the beginning and ending points of a main action sequence, and/or whether or not a user may enjoy a replay of the main action sequence may be determined by processing asset information. As used herein, the term "asset information" refers to data or information associated with the media asset. For example, asset information may include data transmitted with the media asset (e.g., metadata) or stored on local and/or remote equipment (e.g., guidance data). For example, asset information may include play length information, source information, content rating information, frame edits rate information, textual information, and audio and/or visual information. Asset information may also include information regarding the characters, plot, or circumstances of the media asset. For example, asset information may include particular actors, or the point in the play length of the media asset in which the actors appear, particular topics discussed at different points in the play length of the media asset, descriptions of different scenes, and the points in which they occur, during the media asset, or other information that may be used to describe the subject matter or importance of a particular scene or segment (e.g., whether a sports contest is a play-off game). Asset information may also include main action sequence indicators, which are provided by a content provider or a media guidance provider, which indicate to the media guidance application the point in the media asset constituting the beginning and end of a main action sequence.

Asset information may also be generated by third parties. For example, in some embodiments, asset information may include user reviews, transcripts, subtitles, or ratings associated with the media asset. In some embodiments, the media guidance application may monitor the content of social media networks, which discuss the media asset. For example, asset information may include content originating from posts, status updates, or microblog entries on social networks regarding the media asset. For example, a ratings spike or dramatic increase in microblog comments may indicate that the particular point, scene or segment of a media asset is of interest to users. Accordingly, the media guidance application may generate one or more automatic replays of the point, scene, or segment based on the dramatic increase in microblog posts.

Asset information may be processed, or used in correlation with other information, by the media guidance application to determine the genre of a media asset. Asset information may also include information on a genre and/or genre indicators.

As used herein, a "genre" is a type or category of a media asset. In some embodiments, the genre of a media asset may be determined by the subject matter of the media asset (e.g., as indicated by metadata associated with the media asset). In some embodiments, the genre may be determined by cross-referencing other characteristics of the media asset (e.g., the source, the year of production, the characters, the cast and crew, the revenue generated, etc.) with a database (e.g., listing genres of media assets). In some embodiments, the media asset may be characterized in multiple genres, in which multiple genre profiles may be used to determine a main action sequence in a media asset. In some embodiments, the methods and systems described herein may be applied using media content attributes associated with a criterion other than genre (e.g., based on a rating, channel, various metadata tags, release date, broadcast date, user group, etc.).

As used herein, "genre indicators" refers to any asset information used by the media guidance application to determine the genre of a media asset. For example, genre indicators may include signals, metadata, triggers, flags, or data packets associated with the media asset that may indicate to the media guidance application that the media asset has a particular genre. In some embodiments, the media guidance application may receive the genre indicators from a content source (e.g., content source 416 (FIG. 4)), a media guidance data source (e.g., media guidance data source 418 (FIG. 4)), a user generated data source (e.g., user generated data source 424 (FIG. 4)), user equipment (e.g., user equipment 402, 404, and 406), or any other device accessible via a communications network (e.g., communications network 414 (FIG. 4)).

In some embodiments, genre indicators may include information retrieved and/or processed in the asset information. For example, by processing asset information (e.g., play length, content rating, characters, frame edit rate, rules, participants, sponsors, textual descriptions, etc.), the media guidance application may identify particular genre indicators. In some embodiments, genre indicators, whether received or identified, may be compared to an external or internal database (e.g., a look-up table featuring genre indicators and the genres to which they refer).

As used herein, a "user profile," refers to a compilation of interests of a user generated by the user and/or a third party. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access.

In some embodiments, an attribute of a media asset or asset information associated with the media asset may be compared to user criterion (e.g., included in a user profile) to determine whether or not to generate a replay of a main action sequence. In some embodiments, the attribute(s) of media content or asset information for the media asset may also be used to determine the point of playback (e.g., the beginning and/or ending points), the scene, or the segment of the media asset that constitutes the main action sequence. For example, in some embodiments (and for some genres), the main action sequence (and its beginning and end points) may be identified as the scene, segment, or particular period of time of the play length of the media asset, which features the highest audio volume, the fastest frame or edit rate, or the largest, longest, or loudest use of a laugh track. The media guidance application may retrieve the audio information included in the asset information of the media asset. By processing the audio information of the media asset, the media guidance application may determine the particular point of playback, scene or segment, which features the highest audio volume, fastest edit rate, or largest user of the laugh track.

In some embodiments, main action sequence (and its beginning and end points) may be identified based on a particular time during the play length of a media asset (e.g., the final twenty minutes of an action movie or television show). For example, in some embodiments, the media guidance application may access historical data regarding media assets of the same type to determine at what points a main action sequence typically begins and ends. For example, historical data for a given category (e.g., episodes of the same media asset or media assets in the same genre) of sitcoms may indicate that a high percentage of sitcoms have a main action sequence at the twenty minute mark in the play length of the media asset. Accordingly, the media guidance application may retrieve the play length information included in the asset information of the media asset to determine a main action sequence in the media asset. By processing the play length information of the media asset, the media guidance application may determine the particular point of playback, scene or segment, which corresponds to the typical beginning and end points of the main action sequence in other media assets of the same genre (e.g., twenty and twenty-five minute mark, respectively).

In some embodiments, the media guidance application may use optical character recognition ("OCR") technology to analyze information featured on or associated with the presentation of the media asset (e.g., on-screen scoreboards displayed during a baseball game). For example, the media guidance application may process the presentation of a scoreboard shown in a media asset to determine the score or circumstances of the game. The media guidance application may also process the subtitles shown with a media asset. By processing the text (e.g., searching for keywords) of the subtitles of the media asset, the media guidance application may determine the particular point of playback, scene or segment, which features particular words, groups or words, or themes/situations indicative of a main action sequence. In some embodiments, the media guidance application may compare keywords found in the subtitles associated with a media asset to a database of subtitles that indicate a main action sequence.

The media guidance application may also determine the main action sequence, the beginning and ending points of the main action sequence, and/or whether or not it corresponds to a user criterion of a media asset by analyzing the content of the media asset. In some embodiments, the media guidance application may incorporate or have access to one or more content-recognition modules, which may be used by the media guidance application to analyze media objects and/or the content of media objects. For example, the media guidance application may include an object recognition module. The object recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the objects in and/or characteristics of video and audio content. For example, the media guidance application may receive a media asset in the form of a video (e.g., an audio/video recording of a user). The video may include a series of frames. For each frame of the video, the media guidance application may use an object recognition module to determine the content and context of a media asset for use in determining whether or not a main action sequence is currently being presented and/or whether or not to generate a replay of the current main action sequence.

In some embodiments, the content-recognition module or algorithm may also include audio analysis and speech recognition techniques, including, but not limited to, Hidden Markov Models, dynamic time warping, and/or neural networks (as described above) to process audio data and/or translate spoken words into text or other data forms that may be processed by the media guidance application. The content-recognition module may also use any other suitable techniques for processing audio and/or visual data. For example, the content-recognition module may analyze audio data to determine the content and context of a media asset for use in determining whether or not a main action sequence is currently being presented and/or whether or not to generate a replay of the current main action sequence.

In some embodiments, attributes of media content or the asset information may indicate several main action sequences within a single media asset. In such cases, the media guidance application may generate a media asset profile of the various main actions sequences. The media guidance application may then compare the identified main action sequences (or rankings associated with the identified main action sequences) to each other or compare the identified main action sequences (or rankings) to a user profile or a threshold ranking (as described below) to determine whether or not to generate a replay of the current main action sequence.

In some embodiments, to determine whether or not to generate a replay of the current main action sequence, the media guidance application compares the identified main action sequence to a user criterion. As used herein, "user criterion or criteria" refers to any characteristic which affects the likelihood that a user would prefer to view a replay of a main action sequence.

For example, a user criterion may include the presence of particular content (e.g., an actor, an exciting scene, a plot-twist, or any other attribute related to content or context) of the media asset or main action sequence, or may include an indication that the user may prefer a replay of a main action sequence (e.g., a user input requesting a replay, third party information indicating that users similar to the current user are likely to enjoy a replay of a main action sequence, recommendations by other users, etc.).

In some embodiments, the media guidance application may also compare the identified main action sequence to a user criterion to determine a ranking associated with the identified main action sequence. The ranking may represent a numerical indication of the amount that the identified main action sequence corresponds to the user criterion.

The media guidance application may also compare the ranking of the identified main action sequence to the rankings of other main action sequences or to a threshold ranking. As used herein, a "threshold ranking" refers to a minimum ranking that main action sequences must have in order to be replayed by the media guidance application. For example, the media guidance application may assign numerical amounts (e.g., a percentage, ratio, etc.) that represent how well a particular identified main action sequence corresponds to the user criterion. The media guidance application may then compare the numerical amount to a threshold numerical amount (e.g., corresponding to the threshold ranking) in order to determine whether or not to generate an automatic replay of the main action sequence.

For example, the media guidance application may only generate replays of main action sequences rankings higher than the threshold ranking. Accordingly, only main action sequences with a high degree of correspondence with the user criterion will be automatically replayed for the user by the media guidance application.

In some embodiments, the media guidance application may determine a number of times to automatically replay the main action sequence based on the ranking. For example, the media guidance application may replay a first identified main action sequence twice and a second identified main action sequence only once, if the first identified main action sequence has a higher ranking than the second identified main action sequence.

In addition, to determine the threshold ranking, the media guidance application may determine rankings associated with all main action sequences in the media asset, retrieve a maximum number of main action sequences in the media asset that may be automatically replayed (e.g., as determined by a user setting), and select the threshold ranking such that only the maximum number of main action sequences correspond to the threshold ranking. For example, a user may indicate that he/she only wishes for three main action sequences to be replayed, in response the media guidance application may establish a threshold ranking that only three main action sequences in the media asset correspond to (e.g., only three main action sequence have a higher ranking than the threshold ranking).

In some embodiments, the main action sequence may be replayed in a presentation displayed on user equipment. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smart phone, or any other television equipment, computing equipment, wireless device, or any device comprising a display screen, and/or combination of the same. The media guidance applications may be provided as on-line applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections, additional content, and/or main action sequences.

Figure 2:
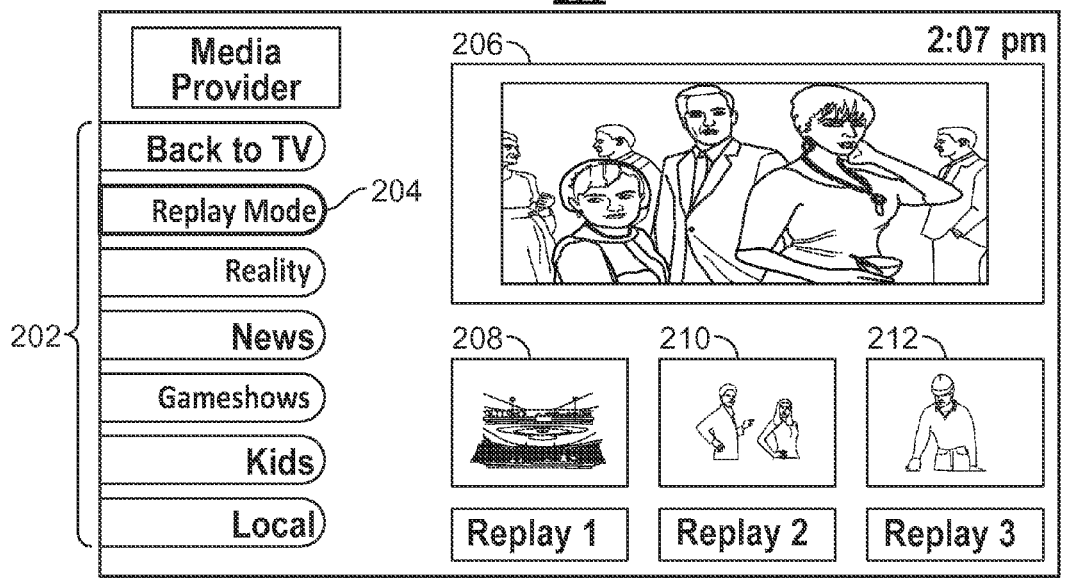
FIG. 2 shows an illustrative media guidance application that may be used to adjust user settings in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. In addition, the displays of FIGS. 1-2 may implement mosaic displays, which display one or more video assets at any one time. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, user profile information, or data about the progression of the media content.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L. P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g., FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browser overlay, or other options.

The media guidance application may be personalized based on a user's preferences or a user profile. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

Another display arrangement for providing media guidance is shown in FIG. 2. Video mosaic display 200 includes selectable options 202 for content information organized based on content type, genre, and/or other organization criteria. Selectable options 202 may represent different categories or options in the video mosaic display 200. In display 200, "Replay Mode" option 204 is selected. As such, the media guidance application may generate automatic replays throughout the presentation of the media asset. In some embodiments, the presentation of the media asset may be interrupted to present the replay. Additionally or alternatively, the media guidance application may generate overlays or separate viewing windows (e.g., window 206, window 208, window 210, and window 212), which may present the generated replay.

In some embodiments, the replay of the main action sequence may be displayed in series with the presentation of the media asset (e.g., the presentation of the media asset is paused while the replay of the main action sequence is replayed) or in parallel (e.g., the media asset continues to be presented without interruption while the replay of the main action sequence is presented simultaneously in a mosaic display).

Figure 3:
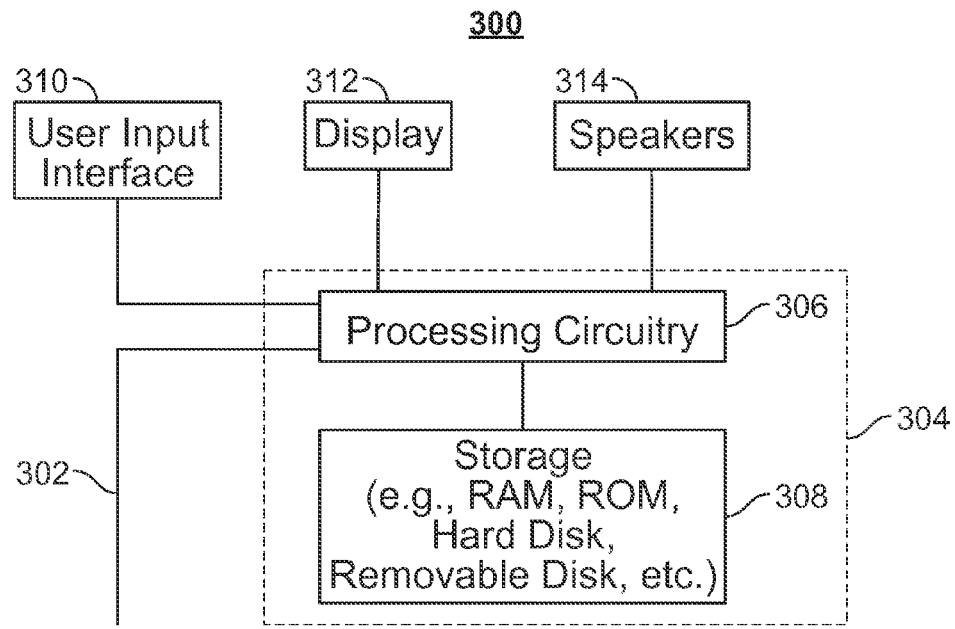
FIG. 3 is a block diagram of an illustrative user equipment device in accordance with some embodiments of the disclosure.
Figure 4:
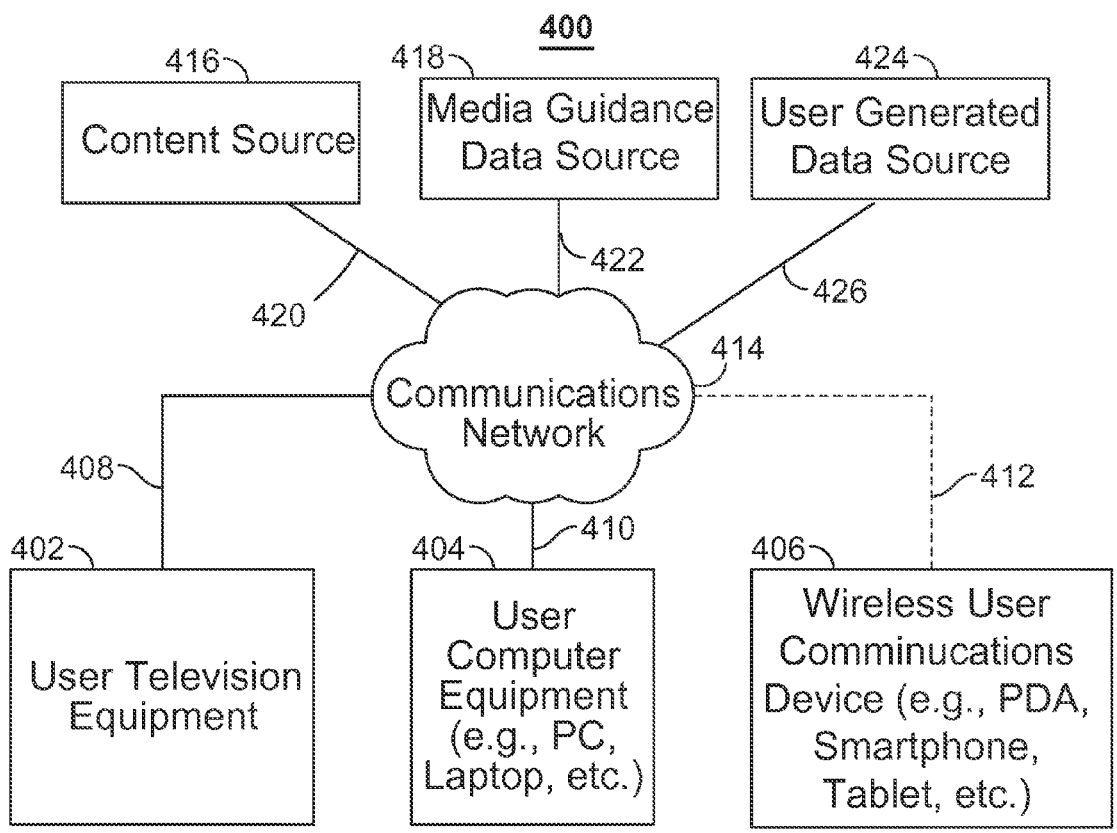
FIG. 4 is a block diagram of an illustrative media system in accordance with some embodiments of the disclosure.

In some embodiments, the media assets or main action sequences may be selected, produced, stored, and/or displayed on any of the devices shown in FIGS. 3-4. For example, the media guidance application may be implemented on content source 416 (FIG. 4), media guidance data source 418 (FIG. 4), and/or user equipment 402, 404, and/or 406 (FIG. 4), and instruct control circuitry 304 (FIG. 3) to select particular media assets, extract a portion of the selected media assets, store the extracted portions, and display the extracted portions to a user on one or more of devices shown in FIGS. 3-4.

Users may access content and the media guidance application (and its display screens featuring listings described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a stand-alone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some user television equipment 402, include a tuner allowing for access to television programming, all of which may be referred to as simply user equipment. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416, media guidance data source 418, and user generated data source 424 coupled to communications network 414 via communication paths 420, 422 and 426, respectively. Paths 420, 422 and 426 may include any of the communication paths described above in connection with paths 408, 410, and 412. Communications with the content source 416, media guidance data source 418, and user generated data source 424 may be exchanged over one or more communications paths, but are shown as a single path in FIG. 4 to avoid overcomplicating the drawing. In addition, there may be more than one of each of content source 416, media guidance data source 418, and user generated data source 424, but only one of each is shown in FIG. 4 to avoid overcomplicating the drawing. (The different types of each of these sources are discussed below.) If desired, content source 416, media guidance data source 418, and user generated data source 424 may be integrated as one source device. Although communications between sources 416, 418, and 424 with user equipment 402, 404, and 406 are shown as through communications network 414, in some embodiments, sources 416, 418, and 424 may communicate directly with user equipment 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed).

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308 (FIG. 3), and executed by control circuitry 304 (FIG. 3) of a user equipment device 300 (FIG. 3). In some embodiments, media guidance applications may be client-server applications where only a client application resides on the user equipment device, and server application resides on a remote server.

For example, media guidance applications may be implemented partially as a client application on control circuitry 304 (FIG. 3) of user equipment device 300 (FIG. 3) and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider.

Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device. User generated data source 424 may also contain any of the characteristics or attributes of media guidance data source 428.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices.

For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, which provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record or monitor content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
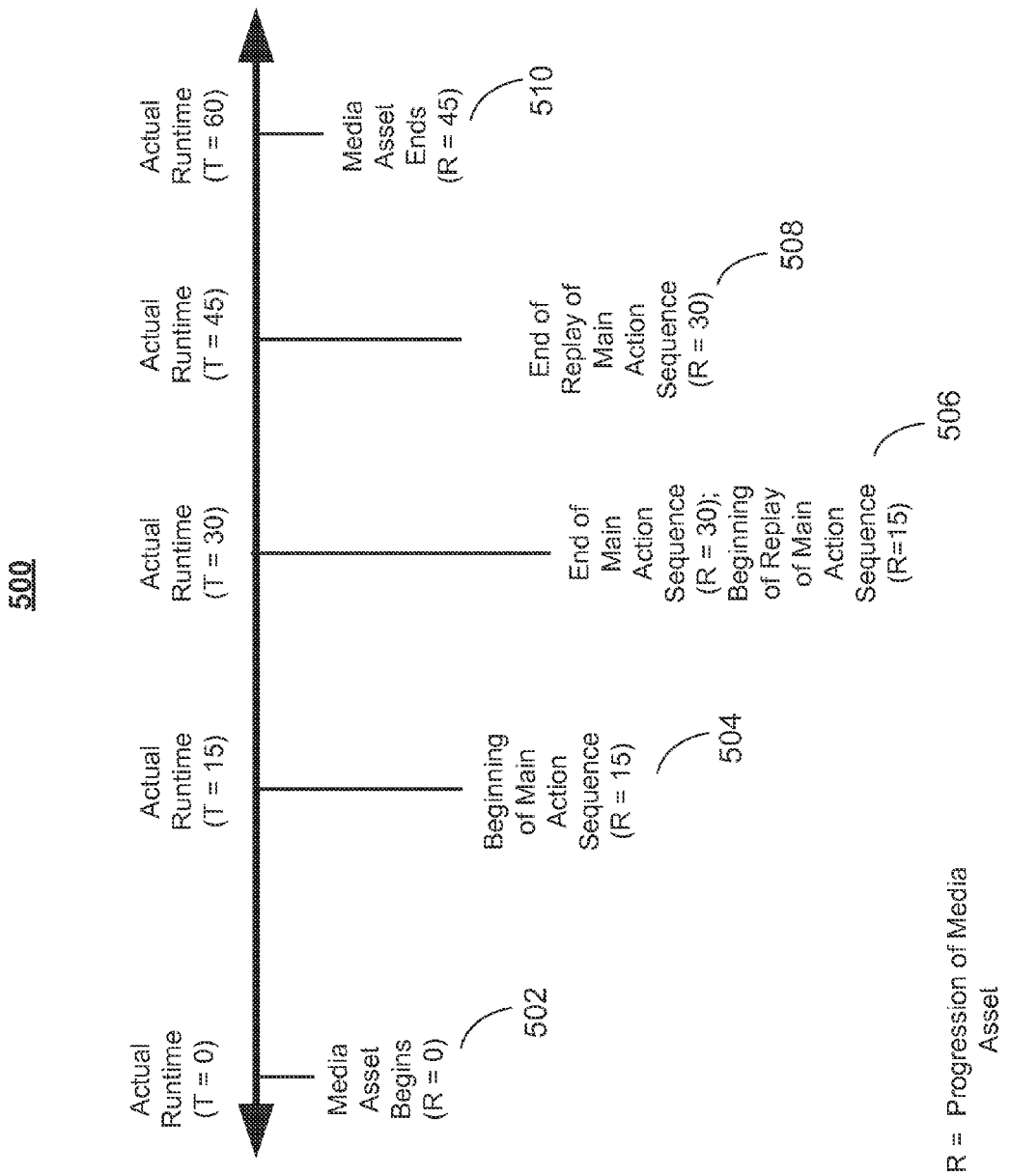
FIG. 5 shows a timeline describing the generation of an automatic replay during a presentation of a media asset in accordance with some embodiments of the disclosure.

FIG. 5 shows a timeline describing the generation of an automatic replay during a presentation of a media asset. The timeline represents a replay of the main action sequence in terms of a beginning point and end point, relative to the beginning point and end point of the media asset. The timeline may result from methods and systems disclosed herein and a presentation of the media asset and replays may be achieved using a media guidance application implemented on any of the devices shown in FIGS. 3-4. In some embodiments, the replay of the main action sequence shown and described in FIG. 5 may be a result of incorporating or combining one or more of the steps shown and described in FIGS. 6 and 7.

FIG. 5 shows timeline 500. At point 502 (e.g., corresponding to the zero minute mark in the normal progression of the media asset) of timeline 500, a user begins viewing a presentation of a media asset (e.g., as viewed on display 200 (FIG. 2)). In some embodiments, point 502 may also correspond to the beginning of playback of a media asset or the beginning of a particular scene or segment in the media asset.

At point 504, a main action sequence, as determined by the media guidance application, begins (e.g., corresponding to the fifteen minute mark in the normal progression of the media asset). The media guidance application may determine that a main action sequence is beginning based on asset information as described above. Additionally or alternatively, the media guidance application may determine point 504 represents the beginning of a scene (e.g., via the object recognition methods described above). The media guidance application may later determine (e.g., at a point in time between point 504 and point 506) that the current scene is a main action sequence (e.g., via a ratings spike, dramatic increase in microblog comments, user input, genre profile cross-reference, etc. that indicates that the particular point, scene or segment of a media asset is of interest to users).

In some embodiments, the media guidance application may also determine a different beginning point for the main action sequence based on a user profile. For example, in some embodiment, the media guidance application may determine a main action sequence of the media asset based on a user profile specific to the particular user. For example, timeline 500 may describe a main action sequence beginning at point 504 for a first user; however, a beginning point for the main action sequence may begin (or end) at a different point in the media asset for a second user. For example, a second user may prefer more concise or extending main action sequences; therefore, the media guidance application may not start at the point corresponding to the beginning of a scene, but a time before or after that point.

At point 506, the main action sequence of the media asset ends (e.g., corresponding to the thirty minute mark in the normal progression of the media asset), and an automatic replay of the main action sequence begins as determined by the media guidance application (e.g., as determined by process 600 (FIG. 6)). In some embodiments, the media guidance application may generate a pop-up message (e.g., "Let's See That Again!") or prompt the user to view a replay of the main action sequence (e.g., offer the user an on-screen option to trigger an automatic replay). Additionally or alternatively, the media guidance application may overlay text (e.g., "Replay") on the screen during an automatic replay or use any other indicator to indicate to a user that an automatic replay is currently being presented.

In some embodiments, the media guidance application may automatically generate a separate window (e.g., as described in FIG. 2) to present the replay of the main action sequence. The media guidance application may then provide the user with fast-access playback options related to the automatic replay. As referred to herein, the phrase "fast-access playback operations" should be understood to mean any operation that pertains to playing back a non-linear media asset faster than normal playback speed or in a different order than the media asset is designed to be played, such as a fast-forward, rewind, skip, chapter selection, segment selection, skip segment, jump segment, next segment, previous segment, skip advertisement or commercial, next chapter, previous chapter or any other operation that does not play back the media asset at normal playback speed. The fast-access playback operation may be any playback operation that is not "play," where the play operation plays back the media asset at normal playback speed. The media guidance application may also allow the user to close the separate window featuring the automatic replay when the user no longer wishes to view the replay.

At point 508, the automatic replay of the main action sequence ends, and the presentation of the media asset resumes until the media asset ends at point 510. In some embodiments, the media guidance application may generate multiple replays of the main action sequence. For example, if a main action sequence is determined to be of particular interest to the user, the media guidance application may show a replay of the main action sequence two or more times (or until a user makes a selection to stop the replay). In some embodiments, the media guidance application may continue the presentation of the media asset until another main action sequence is identified. The media guidance application may then interrupt the presentation for the media asset with a presentation of the other main action sequence.

In some embodiments, the media guidance application may determine a minimum amount of the presentation that must be presented between automatically replaying different main action sequences. For example, in order to prevent every scene or segment of a media asset from being replayed (which could distract or annoy the user), the media guidance application may trigger an automatic replay only after a particular amount of time or number of scenes has passed since the last automatic replay was triggered. For example, a user profile may indicate that the minimum amount of time between subsequent automatic replays in, for example, two minutes in normal progression of the media asset or two subsequent scenes of the media assets.

Figure 6:
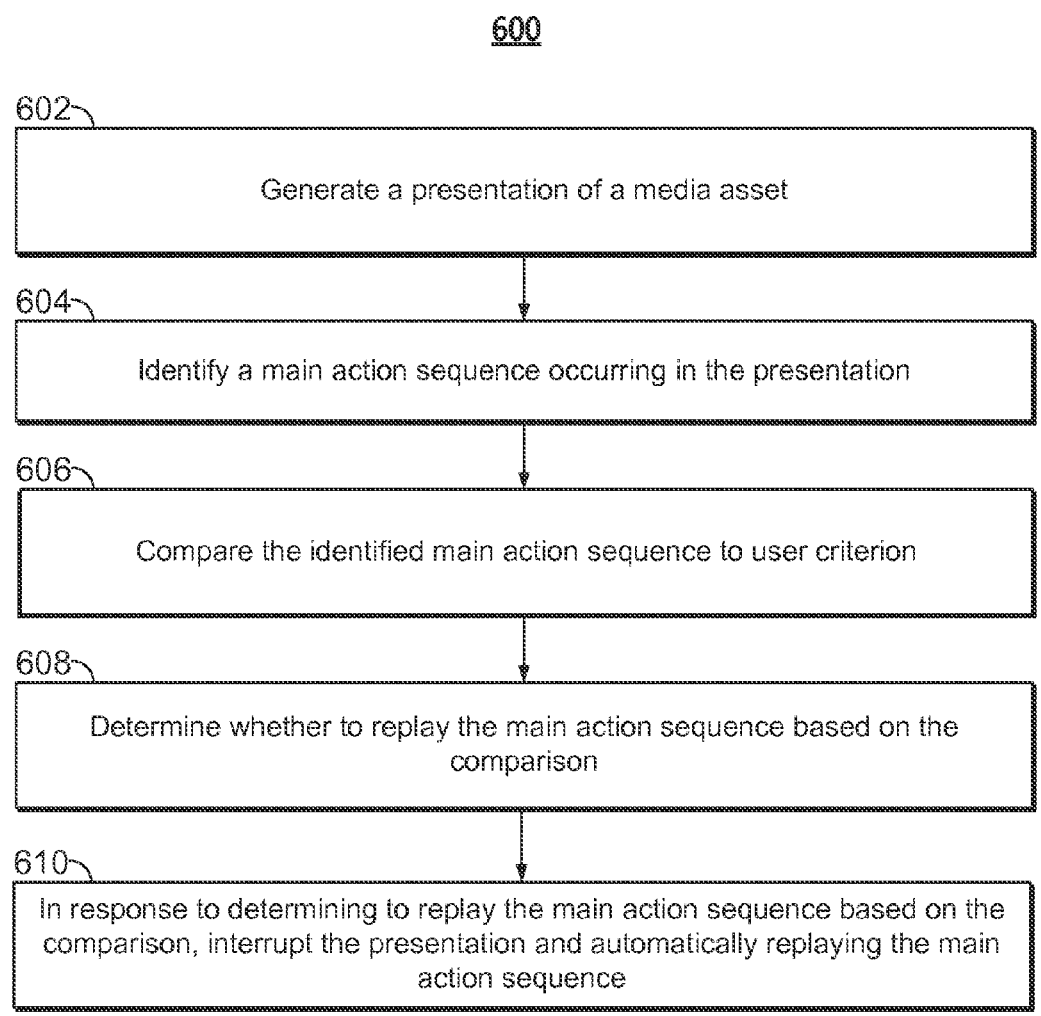
FIG. 6 is a flow-chart of illustrative steps involved in generating an automatic replay during a presentation of a media asset in accordance with some embodiments of the disclosure.

FIG. 6 is a flow-chart of illustrative steps involved in generating an automatic replay during a presentation of a media asset. It should be noted that process 600 or any step thereof, could be displayed on, or provided by, any of the devices shown in FIGS. 3-4. For example, process 600 may be executed by control circuitry 304 (FIG. 3) as instructed by the media guidance application. In addition, one or more steps of process 600 may be incorporated into or combined with one or more steps of any other process as described in FIG. 7.

At step 602, the media guidance application generated a presentation of a media asset. For example, a user may have selected a media listing (e.g., program listing 108 (FIG. 1)) to view. In response, the media guidance application may have retrieved the media asset associated with the media listing and generated the media asset for display (e.g., on display 312 (FIG. 3)). In some embodiments, the media guidance application may also receive asset information associated with a media asset with the media asset. For example, in some embodiments, the transmission of asset information (e.g., the title, content, metadata, identification of main action sequence, etc.) may accompany the transmission/selection of the media asset, or a listing for the media asset.

Alternatively or additionally, the media guidance application may store asset information locally (e.g. on storage 308 (FIG. 3)). The media guidance application may then access the asset information as necessary. The media guidance application may also store or have access to asset information on a remote database (e.g., media guidance data source 418 (FIG. 4) and/or any device accessible via communications network 414 (FIG. 4)).

At step 604, the media guidance application identifies a main action sequence of the media asset occurring in the presentation. For example, the media guidance application may detect content in the media asset that indicates a main action sequence while a user is viewing the presentation. Additionally or alternatively, the media guidance application processes asset information associated with the media asset that indicates the current point or segment corresponds to a main action sequence. The media guidance application may also identify the beginning and end points of the main action sequence. The beginning and end point may be included in asset information identifying the main action sequence, or the beginning and end points may be determined by the media guidance application (e.g., using the object recognition methods described above).

At step 606, the media guidance application compares the identified main action sequence to user criterion. For example, the user criterion may indicate whether or not the identified main action sequence corresponds to a media interest of a user. For example, a user profile may include user preferences related to a media asset. Upon detecting that a particular main action sequence corresponds to particular interests of the user, the media guidance application may generate an automatic replay of the main action sequence.

For example, the media guidance application may determine that a user enjoys car chases in movies. By processing asset information associated with the media asset or using the object recognition methods discussed above, the media guidance application may determine that the current main action sequence includes a car chase. Based on that determination, the media guidance application may generate an automatic replay of the main action sequence featuring the car chase.

In another example, the media guidance application may determine that a user enjoys a particular character in a movie. By processing subtitles information, the media guidance application may determine when a particular character is appearing in the movie. Based on that determination, the media guidance application may generate an automatic replay of the main action sequence including the character.

The media guidance application may make comparisons based on comparing information about the identified main action sequence to a user profile containing user preferences. For example, the user profile may be structured as a database that the media guidance application may query (e.g., using control circuitry 304 (FIG. 3)) for information associated with user preferences related to main action sequences of media assets or conditions or rules associated with generating an automatic replay. In some embodiments, the media guidance application may input (e.g., via control circuitry 304 (FIG. 3)) attributes of the media content of the current main action sequence into the database, and in response, the media guidance application may receive (e.g., via I/O path 302 (FIG. 3)) a determination as to whether or not those attributes match attributes of main action sequences that should have automatic replays generated according to the user preferences.

Additionally or alternatively, a user criterion may include the receipt of a user selection indicting a desire to automatically replay the identified main action sequence. For example, while viewing a media asset, a user may request (e.g., via user input interface 310 (FIG. 3)) to view the current main action sequence again. In response, the media guidance application may automatically determine the beginning point and end point of the current main action sequence and generate a presentation of the main action sequence again after the current main action sequence concludes.

Additionally or alternatively, the user criterion may include information (e.g., status or microblog updates to a social network indicating users recommend and/or are interested in the current main action sequence) generated at a remote location (e.g., user generated data source 424 (FIG. 4)). For example, while viewing a live media asset, the media guidance application may monitor social media networks associated with the user. In response to determining that the current main action sequence corresponds to an uptick in social media activity, the media guidance application may automatically generate a replay of the current main action sequence.

For example, in response to social media posts (e.g., "That Was A Foul!") corresponding to the presentation of the current main action sequence of a media asset (e.g., a controversial play of a televised basketball game), the media guidance application may generate an automatic replay of the current main action sequence (e.g., the controversial play), so that a user may review the current main action sequence with the context of the social media posts in mind.

In another example, while viewing a media asset, the media guidance application may detect a point in the media asset (e.g., representing a main action sequence) that numerous other users (e.g., associated with the user via a social media network) have recommended (e.g., via input to their respective user devices indicating a preference for the current segment of the media asset). In response to determining that the current segment corresponds to the numerous recommendations, the media guidance application may identify the segment as a main action sequence. The media guidance application may then determine the beginning and end points of the identified main action sequence and generate a replay of the identified main action sequence.

At step 608, the media guidance application determines whether to replay the main action sequence based on the comparison. For example, in response to determining that the attributes of media content of the current main action sequence match attributes of main action sequences that should have automatic replays generated according to the user preferences, in response to determining that a user input requesting a replay of the current main action sequence be shown, or in response to receiving information indicating users recommend and/or are interested in the current main action sequence, the media guidance application may interrupt the presentation of the media asset and automatically replay the current main action sequence at step 610.

In some embodiments, the media guidance application may automatically store the presentation of the media asset while the presentation is interrupted with an automatic replay of the main action sequence. Following the presentation of the replay, the media guidance application will resume the media asset from the end point of the main action sequence and continue to present the media asset from the storage using a FIFO system.

It should be noted that any of the devices or equipment discussed in relation to FIGS. 3-4 could be used to perform one of more of the steps in FIG. 6. It is also contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method.

Figure 7:
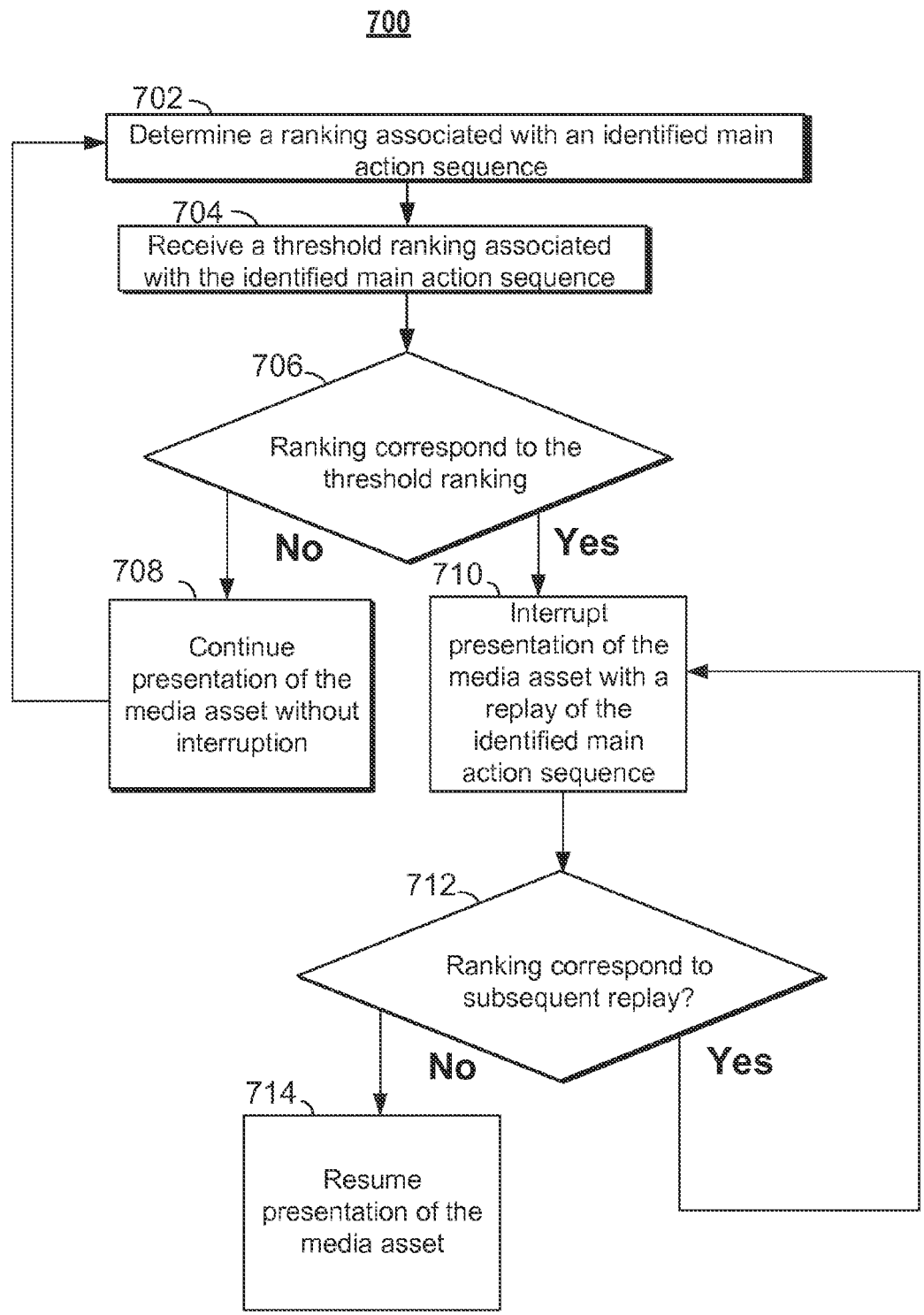
FIG. 7 is a flow-chart of illustrative steps involved in determining whether or not to generate one or more automatic replays during a presentation of a media asset in accordance with some embodiments of the disclosure.

FIG. 7 is a flow-chart of illustrative steps involved in determining whether or not to generate one or more automatic replays during a presentation of a media asset. It should be noted that process 700 or any step thereof, could be displayed on, or provided by, any of the devices shown in FIGS. 3-4. For example, process 700 may be executed by control circuitry 304 (FIG. 3) as instructed by the media guidance application. In addition, one or more steps of process 700 may be incorporated into or combined with one or more steps of any other process as described in FIG. 6.

Process 700 describes a process for determining whether or not to generate one or more automatic replays during a presentation of a media asset based on a comparison with a threshold ranking. At step 702, the media guidance application determines a ranking associated with an identified main action sequence. For example, the media guidance application may retrieve various attributes about the identified main action sequence. The attributes may then be compared to a user profile to determine a numerical indication of the amount that the main action sequence corresponds to the user profile or user criterion.

For example, the media guidance application may input (e.g., using control circuitry 304 (FIG. 3)) the various attributes of media content of the main action sequence into a database (e.g., storage 308 (FIG. 3), content source 416 (FIG. 4), media guidance data source 418 (FIG. 4), and/or any device accessible via communications network 414 (FIG. 4)). The database may determine a numerical amount that each attribute corresponds to and sum the numerical amounts to generate a numerical amount associated with the main action sequence. The media guidance application may use the numerical amount as a ranking for the main action sequence.

At step 704, the media guidance application receives a threshold ranking associated with the identified main action sequence. For example, the media guidance application may receive/retrieve a threshold ranking (e.g., from storage 308 (FIG. 3), content source 416 (FIG. 4), media guidance data source 418 (FIG. 4), and/or any device accessible via communications network 414 (FIG. 4)). The threshold ranking may indicate a minimum ranking that main action sequences must correspond to the user criterion to be replayed.

The media guidance application may also determine a threshold ranking based on the current user criterion. For example, the media guidance application may generate a replay for only the highest ranked main action sequence. In such case, the media guidance application may establish a threshold ranking such that only the highest ranked main action sequence corresponds with it. In order to do so, the media guidance application may first rank all of the main action sequences in the media asset. For example, the media guidance application may retrieve asset information identifying each main action sequence and process each main action sequence according to step 702 in order to determine a rank for each main action sequence. The media guidance application may then establish a threshold ranking based on the ranks of the main actions sequences.

At step 706, the media guidance application determines whether the ranking of the identified main action sequence corresponds to the threshold ranking. For example, the media guidance application may determine whether or not the ranking for the identified main action sequence exceeds the threshold ranking. If the identified main action sequence does not correspond to the threshold ranking, the media guidance application proceeds to step 708 and continues presentation of the media asset without interruption. After step 708, the media guidance application returns to step 702.

If the identified main action sequence does correspond to the threshold ranking, the media guidance application proceeds to step 710 and interrupts the presentation of the media asset with a replay of the identified main action sequence at step 710. For example, the media guidance application may halt the playback of the media asset and instead generate a presentation starting with the beginning point of the identified main action sequence an ending with the ending point of the main action sequence.

At step 712, the media guidance application determines whether or not the ranking of the identified main action sequence corresponds to a subsequent replay. If the media guidance application determines that the ranking of the identified main action sequence corresponds to a subsequent replay, the media guidance application returns to step 710 and interrupts the presentation of the media asset with another replay of the identified main action sequence. If the media guidance application determines that the ranking of the identified main action sequence does not correspond to a subsequent replay, the media guidance application proceeds to step 714 and resumes presentation of the media asset.

For example, in some embodiments, the media guidance application may generate one or more replays of the identified main action sequence. For example, even if both a first and second main action sequences correspond to the threshold ranking, the media guidance application may replay the first main action sequence twice and the second main action sequence only once, if the first identified main action sequence has a higher ranking (e.g., corresponding to a subsequent replay) than the second identified main action sequence (e.g., not corresponding to a subsequent replay).

Additionally or alternatively, the ranking of the main action sequence may be compared to a second threshold ranking at step 712. For example, the second threshold may indicate a ranking at which the identified main action sequence is replayed a second time. If the ranking of the identified main actions sequence corresponds to the second threshold ranking, the media guidance application may replay the identified main action sequence a second time. The media guidance application may also compare the ranking of the identified media guidance application to subsequent iterations of a threshold ranking in order to determine the number of times the identified main action sequence is replayed.

In some embodiments, the media guidance application may also prompt the user for a decision as to whether or not the user wishes to view a subsequent replay of the identified main action sequence. For example, upon conclusion of the replay of the identified main action sequence, the media guidance application may offer the user the option to resume the presentation of the media asset or generate a subsequent presentation of the replay of the identified main action sequence.

The media guidance application may also apply rules of conditions to the replay or subsequent replays of identified main action sequences. For example, the media guidance application may prevent replays from generating without user input (e.g., without a user selection to generate a replay of the current main action sequence), if a previously identified main action sequence generated too recently (e.g., in terms of an amount of time or number of scenes or frames). Additionally or alternatively, the media guidance application may prevent replays from generating without user input (e.g., without a user selection to generate a replay of the current main action sequence), if a certain number of main action sequences have already had replays automatically generated by the main action sequence. For example, a user setting (e.g., included in a user profile) may limit the number of main action sequence that may include automatic replays to a certain number (e.g., three) during a single presentation of the media asset. By limiting the frequency and/or number of automatic replays of identified main action sequences, the media guidance application can preserve their novelty to the user.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one of more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for generating automatic replays in media assets, the method comprising:
   generating a presentation of a media asset;
   identifying a first main action sequence and a second main action sequence occurring in the presentation;
   comparing the first and the second identified main action sequences to a user criterion;
   determining whether to replay the first and the second main action sequences based on the comparison;
   in response to determining to replay the first and the second main action sequences based on the comparison, comparing an actual amount of the presentation between the first and the second main action sequences to a minimum amount of the presentation that must be presented between the first and the second main action sequences; and
   in response to determining the actual amount of the presentation between the first and the second main action sequences exceeds the minimum amount of the presentation that must be presented between the first and the second main action sequences, interrupting the presentation and automatically replaying the second main action sequence.

2. The method of claim 1, further comprising resuming the presentation after automatically replaying the first and the second main action sequences.

3. The method of claim 1, wherein the user criterion indicates whether or not the first and the second identified main action sequences correspond to a media interest of a user, a user selection indicting a desire to automatically replay the first and the second identified main action sequences, or information generated from a remote location indicating users are likely to desire to automatically replay the first and the second identified main action sequences.

4. The method of claim 1, wherein identifying the first and the second main action sequences occurring in the presentation further comprises identifying:
   a first beginning point and a first end point of the first main action sequence; and
   a second beginning point and a second end point of the second main action sequence.

5. The method of claim 1, wherein identifying the first and the second main action sequences for a media asset further comprises:
   determining a genre of the media asset; and
   retrieving a genre profile for the determined genre that defines attributes of media content that are indicative of main action sequences.

6. The method of claim 5, wherein the attributes of media content that are indicative of main action sequences define points typically associated with main action sequences in media assets having a same genre as the media asset, and wherein identifying the first and the second main action sequences in the media asset comprises identifying a first point and a second point in a play length of the media asset corresponding to the defined points.

7. The method of claim 1, wherein comparing the first and the second identified main action sequences to the user criterion further comprises:
   determining a first ranking associated with the first identified main action sequence, wherein the first ranking indicates a first amount the first identified main action sequence corresponds to the user criterion;
   determining a second ranking associated with the second identified main action sequence, wherein the second ranking indicates a second amount the second identified main action sequence corresponds to the user criterion;
   receiving a first threshold ranking associated with the first identified main action sequence, wherein the first threshold ranking indicates a first minimum amount that main action sequences must correspond to the user criterion to be replayed;
   receiving a second threshold ranking associated with the second identified main action sequence, wherein the second threshold ranking indicates a second minimum amount that the main action sequences must correspond to the user criterion to be replayed;
   in response to determining that the first ranking corresponds to the first threshold ranking, transmitting a first instruction to automatically replay the first identified main action sequence; and
   in response to determining that the second ranking corresponds to the second threshold ranking, transmitting a second instruction to automatically replay the second identified main action sequence.

8. The method of claim 7, further comprising determining a first number of times to automatically replay the first main action sequence based on the first ranking and a second number of times to automatically replay the second main action sequence based on the second ranking.

9. The method of claim 7, wherein determining the first and the second threshold rankings comprises:
- determining rankings associated with all main action sequences in the media asset;
- retrieving a maximum number of main action sequences in the media asset that may be automatically replayed; and
- selecting the first and the second threshold rankings such that only the maximum number of main action sequences correspond to the first and the second threshold rankings.

10. A system for generating automatic replays in media assets, the system comprising control circuitry configured to:
- generate a presentation of a media asset;
- identify a first main action sequence and a second main action sequence occurring in the presentation;
- compare the first and the second identified main action sequences to a user criterion;
- determine whether to replay the first and the second main action sequences based on the comparison;
- in response to determining to replay the first and the second main action sequences based on the comparison, compare an actual amount of the presentation between the first and second main action sequences to a minimum amount of the presentation that must be presented between the first and the second main action sequences; and
- in response to determining the actual amount of the presentation between the first and the second main action sequences exceeds the minimum amount of the presentation that must be presented between the first and the second main action sequences, interrupt the presentation and automatically replay the second main action sequence.

11. The system of claim 10, further comprising control circuitry configured to resume the presentation after automatically replaying the first and the second main action sequences.

12. The system of claim 10, wherein the user criterion indicates whether or not the first and the second identified main action sequences correspond to a media interest of a user, a user selection indicting a desire to automatically replay the first and the second identified main action sequences, or information generated from a remote location indicating users are likely to desire to automatically replay the first and the second identified main action sequences.

13. The system of claim 10, wherein the control circuitry configured to identify the first and the second main action sequences occurring in the presentation is further configured to identify:
- a first beginning point and a first end point of the first main action sequence; and
- a second beginning point and a second end point of the second main action sequence.

14. The system of claim 10, wherein the control circuitry configured to identify the first and the second main action sequences for a media asset is further configured to:
- determine a genre of the media asset; and
- retrieve a genre profile for the determined genre that defines attributes of media content that are indicative of main action sequences.

15. The system of claim 14, wherein the attributes of media content that are indicative of main action sequences define points typically associated with main action sequences in media assets having a same genre as the media asset, and wherein the control circuitry configured to identify the first and the second main action sequences in the media asset is further configured to identify a first point and a second point in a play length of the media asset corresponding to the defined points.

16. The system of claim 10, wherein the control circuitry configured to compare the identified main action sequence to the user criterion is further configured to:
- determine a first ranking associated with the first identified main action sequence, wherein the first ranking indicates a first amount the first identified main action sequence corresponds to the user criterion;
- determine a second ranking associated with the second identified main action sequence, wherein the second ranking indicates a second amount the second identified main action sequence corresponds to the user criterion;
- receive a first threshold ranking associated with the first identified main action sequence, wherein the first threshold ranking indicates a first minimum amount that main action sequences must correspond to the user criterion to be replayed;
- receive a second threshold ranking associated with the second identified main action sequence, wherein the second threshold ranking indicates a second minimum amount that the main action sequences must correspond to the user criterion to be replayed;
- in response to determining that the first ranking corresponds to the first threshold ranking, transmit a first instruction to automatically replay the first identified main action sequence; and
- in response to determining that the second ranking corresponds to the second threshold ranking, transmit a second instruction to automatically replay the second identified main action sequence.

17. The system of claim 16, further comprising control circuitry configured to determine a first number of times to automatically replay the first main action sequence based on the first ranking and a second number of times to automatically replay the second main action sequence based on the second ranking.

18. The system of claim 16, wherein the control circuitry configured to determine the first and the second threshold ranking is further configured to:
- determine rankings associated with all main action sequences in the media asset;
- retrieve a maximum number of main action sequences in the media asset that may be automatically replayed; and
- select the first and the second threshold rankings such that only the maximum number of main action sequences correspond to the first and the second threshold rankings.

* * * * *